United States Patent Office 3,407,577
Patented Oct. 29, 1968

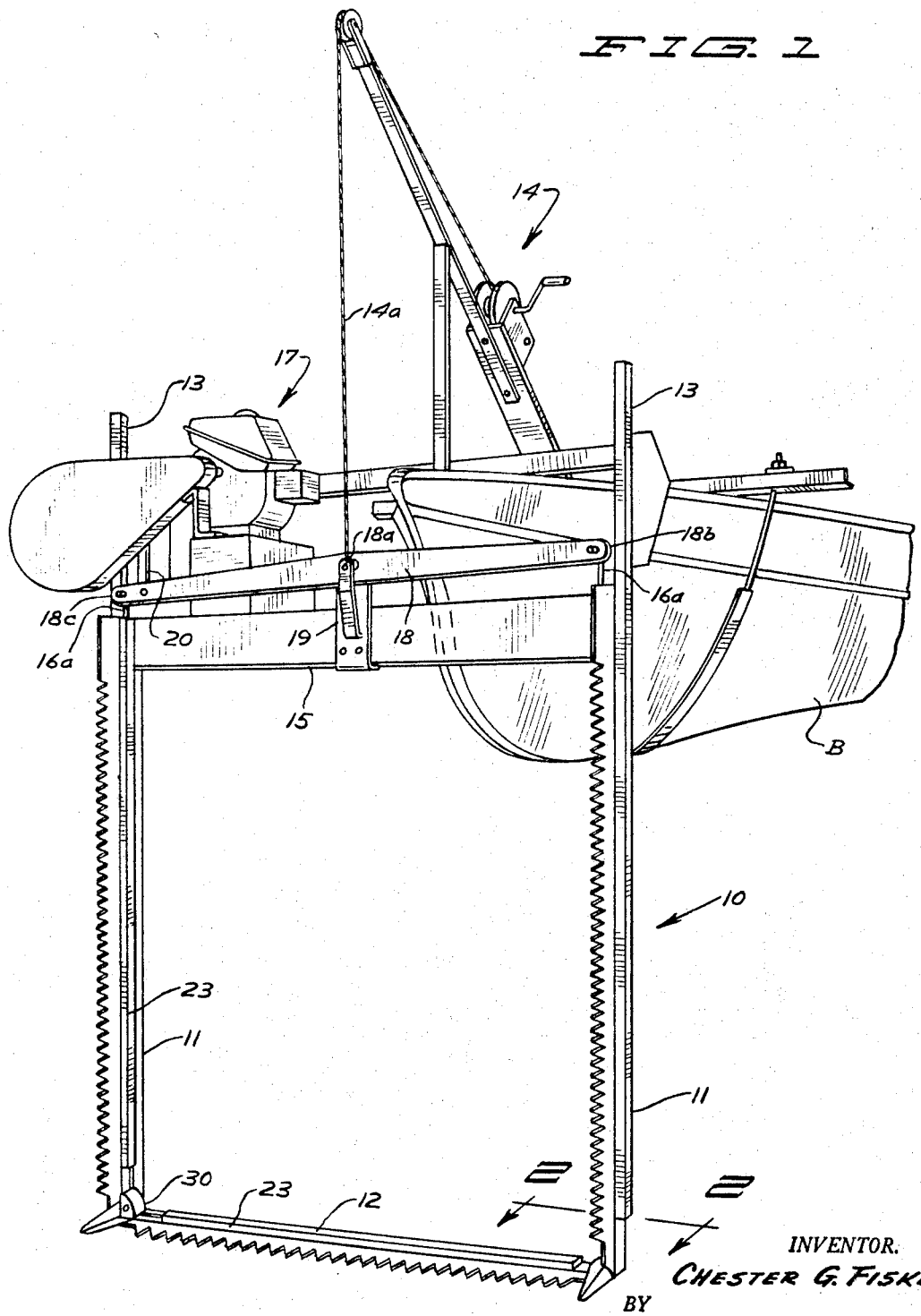

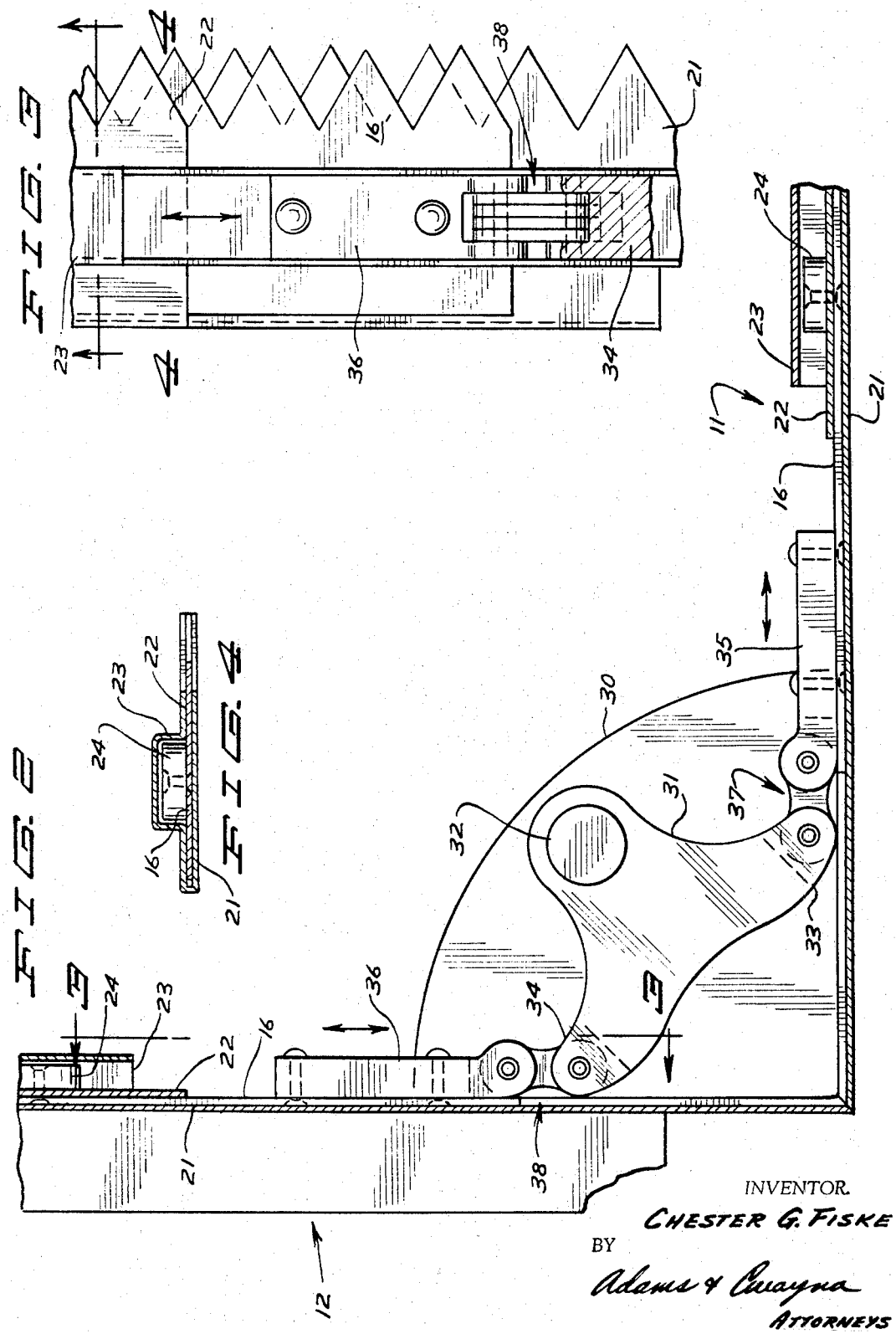

3,407,577
UNDERWATER WEED CUTTER DRIVE MECHANISM
Chester G. Fiske, Minneapolis, Minn., assignor to Jari Corporation, Minneapolis, Minn., a corporation of Minnesota
Filed Dec. 20, 1965, Ser. No. 514,856
4 Claims. (Cl. 56—8)

This invention relates generally to weed cutting apparatus and more particularly to a drive device for an underwater weed cutting blade to permit an underwater weed cutter to effectively cut in two planes.

It has been found that to effectively cut weeds growing underwater a device must be provided which includes at least one generally vertical cutting member and at least one horizontal cutting member which horizontal member is positioned at the lowermost depth of the cutter. The vertical member or members are needed to effectively cut the weeds which tend to grow sideways under water or which tend to float below the surface of the water which weeds would be pushed out of the way of any cutter not capable of cutting in a vertical position.

Most of the weed cutters presently available include oscillating bar type mowers and in order to provide both a vertical and horizontal cutting action many types of drive mechanisms and drive connections have been heretofore provided including but not limited to multiple power source arrangements wherein one such source is provided for each the vertical and horizontal bar mower respectively.

Applicant, however, has found that it is possible through the invention disclosed herein to provide an efficient, effective drive transfer device such that both a vertical and horizontal oscillatory cutting motion may be imparted to respective cutters from a single power source.

The unit as provided herein is essentially a cutter bar connecting device capable of transmitting oscillatory power through the angular offset between the vertical and horizontal cutter bar members of the mower. Naturally in order to do the underwater weed cutting the entire mower is ordinarily mounted on a boat having a motor to be driven through the weed bed and the weed cutting device should not provide a large frontal area to impede the progress of the boat through the water or the weeds. Applicant takes this particular factor into consideration with the drive connector he provides in that the unit is substantially small to provide a minimal frontal area but which smallness does not affect the power transmission efficiencies required for proper cutting operation.

It is therefore an object of applicant's invention to provide a power transfer or drive connector device for use with underwater weed cutters and the like whereby the cutting bars may be arranged at various angular offsets to one another and wherein there is no substantial power loss in the drive mechanism.

It is a further object of applicant's invention to provide a drive connector device for the cutting bars of an underwater weed cutter device which has a particularly small frontal area to eliminate any buildup in back resistance as the unit is driven through the water and weeds.

These and other objects and advantages of my invention will more fully appear from the following description made in connection with the accompanying drawings, wherein like reference characters refer to the same or similar parts throughout the several views, and in which:

FIG. 1 is a perspective view of an underwater weed cutter embodying the concepts of applicant's invention illustrated in operative position on a boat;

FIG. 2 is an enlarged section taken substantially along line 2—2 of FIG. 1 illustrating the cutter bar connector device of applicant's invention;

FIG. 3 is a section taken substantially along line 3—3 of FIG. 2; and

FIG. 4 is a section taken substantially along line 4—4 of FIG. 3.

In accordance with the accompanying drawings an underwater weed cutter generally designated 10 is usually arranged for mounting on the bow of a boat B such that as the boat is propelled through the water the cutter device 10 will be at the forward end thereof. The weed cutter 10 for which this drive device is provided includes a pair of vertical cutting members 11—11 and a horizontal cutting member 12 which members 11–12 are arranged to provide a substantially U-shaped cut area. The framing portion or that portion which is normally mounted on the boat, in the form shown includes a pair of vertical braces 13—13 within which the said cutter vertical members 11—11 are arranged for upward and downward positioning through the use of a winch 14. A cross frame member 15 is provided between the vertical cutting elements 11—11 and it is to this member 15 that the winch rope 14a is attached.

To provide oscillation to the blade elements 16 of the cutter elements 11–12 a small power source such as a gasoline engine 17 is provided on brace 15 and a jack bar 18 is pivotally mounted at its center portion 18a to a connector bracket 19 of cross member 15 with the ends thereof 18b–18c pivotally connected to at least selected end portions 16a—16a of the cutter blades 16. Oscillating motion is delivered to jack bar 18 by providing an eccentric fly wheel device driven by power source 17 which is in turn connected to jack bar 18 through a driving rod member 20. This type of oscillating drive train is well known in the art and no further explanation is deemed necessary.

In the form shown the cutter elements 11–12 of course must be sufficiently strong to sustain a cantilevered force when the unit 10 is driven through the water but the important aspects of the cutter elements 11–12 are illustrated in FIGS. 2, 3 and 4 which show a pair of spaced apart parallel stationary toothed elements 21–22 with the moveable cutter element or blade 16 mounted for oscillation therebetween. In order to effectively capture blade element 16 the stationary toothed elements 21–22 provide a substantially U-shaped housing as illustrated in FIG. 4 with blade 16 mounted therebetween.

A blade guide arrangement designated 23 is provided on the inner stationary member 22 and consists of an outstanding U-shaped housing which is designed to receive a guide member 24 fixedly attached to the cutting blade 16 therein. These guide members 24 in the form shown consist of round boss members fixedly attached to blade 16 and these guides are spaced along the entire length of the cutting blades 16 to insure proper guiding of the blade 16 and thus proper meshing of the teeth of the stationary and moveable blades 21, 22, 16 as illustrated in FIG. 3.

The difficulties of an underwater weed cutter of this type is the transfer of a vertical oscillatory motion to the horizontal cutting element 12 and the method provided by applicant to solve this problem is illustrated in FIGS. 2 and 3. In the form shown a small arcuate mounting plate 30 is provided at a junction between a vertical and horizontal element 11–12 and bell crank member 31 symmetrical in form is mounted for rotation through a pin member 32 or the like on plate 30. The arms 33–34 of bell crank 31 are of equal dimension and extend from pivot point 32 to approximate tangency with the line of cutter blades 16—16. A blade connector member 35–36 is provided for secure attachment to the endmost portions of the respective cutting blades 16. Bell crank 31 is joined to members 35–36 through a roller pin and link connecting device designated 37–38 which is designed to permit the necessary freedom of movement between the bell crank and the connector members 35–36. This particular bell crank arrangement permits effective power transfer on the power stroke of the jack bar 18 and in normal operation the bottom cutting blade 16 will be drawn rather than pushed through its cutting path.

The efficiency and effectiveness of the bell crank 31 insures proper closing of the teeth of the moveable blade 16 with respect to the stationary blades 21–22 such that a scissorlike action is provided to effectively cut weeds and the like.

This right angle power drive transmission as provided herein by applicant affords a minimal frontal area defined by mounting plate 30 such that water resistance will be reduced to a minimum as this cutter is driven through the water while still providing sufficient strength and durability for proper and long lasting power transmission to the blades 16. Roller link members 37–38 permit only single planar movement and therefore aid in maintaining the cutting elements 16 in their proper path of oscillating movement. A chain transmission type device would not necessarily provide this planar limitation of movement and any bending from the single plane could distort the path of the cutting blades as well as the ends of the blades themselves and therefore would not provide the effectiveness as obtained with this bell crank device.

It should be obvious that applicant has provided a new and unique drive transmitting device particularly adapted for use with underwater weed cutters or the like wherein a certain angular relation exists between the cutting elements of the weed cutter such that angular variations up to and including 90° between the cutting elements may be obtained.

It will of course be understood that various changes may be made in the form, details, arrangements and proportion of parts without departing from the scope of my invention, which generally stated consists in the matter set forth in the appended claims.

What I claim is:

1. An improvement in underwater weed cutting apparatus which apparatus includes at least a generally vertical oscillating cutting blade member and at least a horizontal oscillating cutting blade member, said improvement including:
   (a) a source of power provided to transmit an oscillating motion to the vertical blade member;
   (b) a drive connector device for transmitting the oscillatory movement of the vertical blade to a horizontal blade including:
      (1) a mounting plate arranged at the junction between a vertical and the horizontal blade member;
      (2) a unitary motion transmitting member pivotally mounted for rotation on said mounting plate having one end thereof connected with said vertical member with the other end thereof connected to said horizontal member, both of said connections constituting a means for permitting only single planar movement of the blades whereby an oscillatory movement will be transmitted to said horizontal member while preventing bending of the connected blade members.

2. The structure set forth in claim 1 wherein said unitary motion transmitting member comprises a bell crank member having a pair of symmetrically formed arm elements which arms are arranged in generally tangent relation respectively to said vertical and horizontal blade members.

3. The structure set forth in claim 2 and flexible connector members including roller pin and link constructions arranged between the arms of said bell crank and the attached ends of said blade members to permit single planar flexibility when said bell crank is rotated in response to a driving force applied to said vertical cutting blade member.

4. The structure set forth in claim 1 wherein said mounting plate has a minimal frontal area whereby the resistance to movement of the weed cutter through the water is maintained at a minimum.

References Cited

UNITED STATES PATENTS

| | | | |
|---|---|---|---|
| 355,396 | 1/1887 | Hileman | 56—236 |
| 592,985 | 11/1897 | Farmer | 56—8 |
| 2,139,310 | 12/1938 | Marchek | 56—283 |
| 2,317,367 | 4/1943 | Foerster | 56—8 |
| 2,571,502 | 10/1951 | Uhland | 56—8 |
| 2,657,512 | 11/1953 | Crandon et al. | 56—8 |

FOREIGN PATENTS

| | | |
|---|---|---|
| 694,981 | 9/1964 | Canada. |
| 699,986 | 12/1930 | France. |
| 1,037,501 | 4/1953 | France. |
| 14,857 | 6/1909 | Great Britain. |
| 456,983 | 11/1936 | Great Britain. |

ALDRICH F. MEDBERY, *Primary Examiner.*